(12) United States Patent
Hamilton, Jr. et al.

(10) Patent No.: US 6,173,085 B1
(45) Date of Patent: Jan. 9, 2001

(54) EDGE ENHANCEMENT USING MODIFIED EDGE BOOST FUNCTION

(75) Inventors: John F. Hamilton, Jr.; James E. Adams, Jr., both of Rochester, NY (US)

(73) Assignee: Eastman Kodak Company, Rochester, NY (US)

( * ) Notice: Under 35 U.S.C. 154(b), the term of this patent shall be extended for 0 days.

(21) Appl. No.: 09/156,480

(22) Filed: Sep. 18, 1998

(51) Int. Cl.⁷ .................................................. G06T 5/00
(52) U.S. Cl. .................... 382/263; 382/264; 382/269; 345/433; 345/136
(58) Field of Search ...................... 345/433, 136, 345/192; 382/263, 254, 261, 266, 269, 262, 260, 267, 258, 256, 199, 200, 312, 316; 358/298, 515, 447, 539; 250/202; 348/240, 387

(56) References Cited

U.S. PATENT DOCUMENTS

| | | | | |
|---|---|---|---|---|
| 5,271,064 | * | 12/1993 | Dhawan et al. | 382/266 |
| 5,523,849 | * | 6/1996 | Jamzadeh | 358/298 |
| 5,825,937 | * | 10/1998 | Ohuchi et al. | 382/261 |
| 6,005,983 | * | 12/1999 | Anderson et al. | 382/254 |
| 6,055,340 | * | 4/2000 | Nagao | 382/261 |

\* cited by examiner

*Primary Examiner*—Jeffery Brier
*Assistant Examiner*—Thu-Thao Havan
(74) *Attorney, Agent, or Firm*—Raymond L. Owens

(57) ABSTRACT

A method of edge enhancing a digital image having pixels, includes acquiring a digital image; computing an edge boost function having positive and negative boost for different portions of the edge of the digital image; adjusting the edge boost function to produce a modified edge boost function such that the gain of the negative boost is greater than the gain of the positive boost; and applying the modified edge boost function to the digital image to provide an edge enhanced digital image.

5 Claims, 5 Drawing Sheets

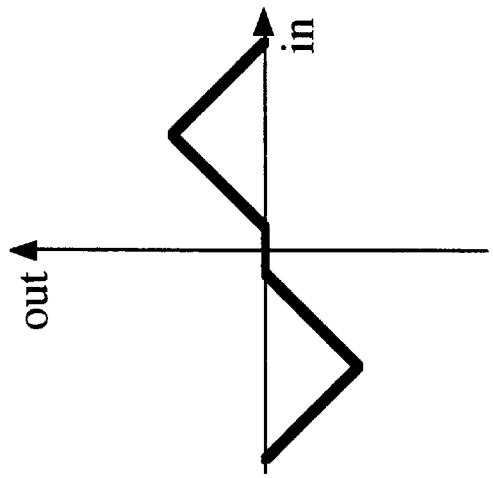
FIG. 2C (Prior Art)
FIG. 3C (Prior Art)
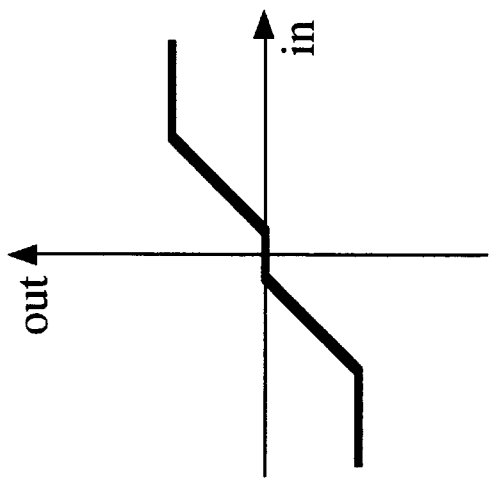
FIG. 2B (Prior Art)
FIG. 3B (Prior Art)
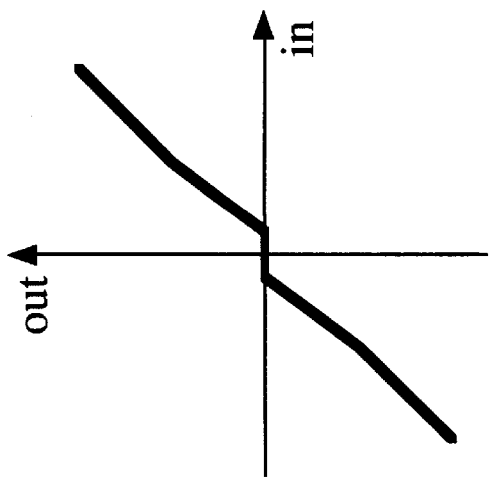
FIG. 2A (Prior Art)
FIG. 3A (Prior Art)

EDGE ENHANCEMENT USING MODIFIED EDGE BOOST FUNCTION

FIELD OF THE INVENTION

This invention relates to edge enhancing digital images.

BACKGROUND OF THE INVENTION

Currently, digital images are derived through various devices including digital cameras and scanners for digitally scanning of film images. Many times the sharpness of an image is degraded by optical elements or by irregularities in the image sensor. For these reasons, it is often desirable to sharpen an image after it has been converted to a digital form. Conventional sharpening methods, such as unsharp masking, achieve the appearance of edge sharpening by locally lightening the lighter portion of an edge region and locally darkening the darker portion of an edge region. The resulting increase in microcontrast provides the sharpening effect. Such methods can be applied to black and white digital images as well as to colored digital images.

Referring to FIG. 1A, a one dimensional trace of an edge profile is shown in which higher code values correspond to lighter shades and lower code values to darker shades. In FIG. 1B, the same edge profile has been further blurred in accordance with the prior art technique of unsharp masking. The curve in FIG. 1B is subtracted from the curve in FIG. 1A and the resulting curve shown in FIG. 1C in which the amplitudes P and N, for positive and negative boost respectively, are approximately the same size. The difference curve of FIG. 1C is added to the original curve in FIG. 1A and this final curve, shown in FIG. 1D, depicts the profile of the sharpened edge. Although unsharp masking was originally a film technique, it also has a digital version. Shown in FIGS. 2A–C are examples of boost kernels which, when applied to a digital image, directly produce boost values analogous to those shown in FIG. 1C and sharpened edges analogous to those shown in FIG. 1D.

When these conventional sharpening methods are applied too aggressively, image artifacts will appear. One artifact is an unnatural (light) halo appearing in the lighter region of an edge. Another artifact is an unnatural dark outline appearing in the darker region of an edge. It is typically that the positive boost required to create the halo artifact is smaller (in absolute value) than the negative boost required to create the outline artifact.

An additional step often taken in digital sharpening is the application of a coring function to reduce the amplification of noise. Three examples of (prior art) coring functions are shown in FIGS. 3A–C. Each initial boost value is used as input to the coring function and the resulting output is the cored boost value. The cored boost value is then added to the original image. The three sample coring functions all show a flat region at the origin which maps any small boost value to zero. These coring functions also exhibit a symmetry which insures that the gains applied to positive and negative boost values are the same. Whether a coring function is used or not, the problem is that the halo artifact will appear for boost levels which are still producing beneficial results in darker edge regions. Consequently, the practical limit of image sharpening is almost always determined by the appearance of the halo artifact.

SUMMARY OF THE INVENTION

It is an object of the present invention to provide a method of edge enhancing digital images which minimizes image artifacts caused by conventional sharpening methods.

This object is achieved by a method of edge enhancing a digital image having pixels, comprising the steps of:
   a) acquiring a digital image;
   b) computing an edge boost function having positive and negative boost for different portions of the edge of the digital image;
   c) adjusting the edge boost function to produce a modified edge boost function such that the gain of the negative boost is greater than the gain of the positive boost; and
   d) applying the modified edge boost function to the digital image to provide an edge enhanced digital image.

ADVANTAGES

It has been previously stated that digital images are often in need of sharpening and that when conventional sharpening fails, it does so most often by producing an undesirable halo artifact in the lighter region of an edge. The present invention produces positive boost and negative boost values at an edge which are significantly different in absolute value. This is accomplished by applying larger gains to negative boost values (for darker edge regions) than the gains applied to positive boost values (for lighter edge regions). The result is that nearly the full beneficial effects of both positive and negative boost values are obtained before either the halo or the outline artifact appears. This means a greater than of artifact-free edge sharpening is available.

BRIEF DESCRIPTION OF THE DRAWINGS

FIG. 1D is a graph depicting the application of the positive and negative boosts of FIG. 1C to the profile shown in FIG. 1a;

FIGS. 2A–2C depict prior art boost kernels for producing positive and negative boosts;

FIGS. 3A–3C depict different examples of coring functions which have been previously used in edge sharpening;

DETAILED DESCRIPTION OF THE INVENTION

Figure 4:
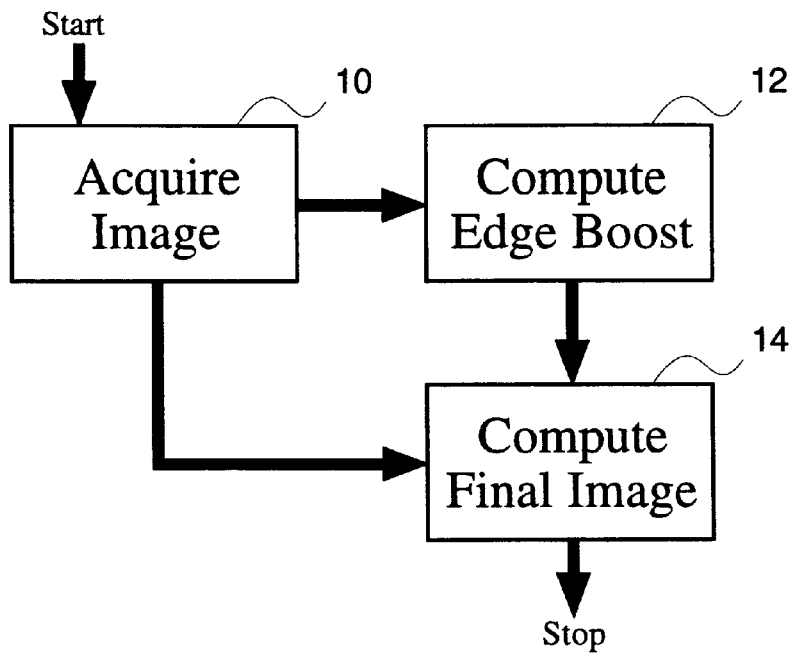
FIG. 4 shows, in block diagram form, the method of the present invention.

Referring to FIG. 4, the process of sharpening an image starts with the acquire image block 10 in which a digital image is obtained by conventional means such as scanning photographic film or direct capture by electronic camera. In the compute edge boost block 12, an edge boost record is derived from the acquired image. The edge boost record and the acquired image are passed to the compute final image block 14 where they are combined to produce a sharpened image. Colored images are added to the edge boost record to each of the red, green, and blue color records of the acquired image. If the acquired image is black and white, the usual method of combination is just the addition of the acquired image and the edge boost record.

Figure 5:
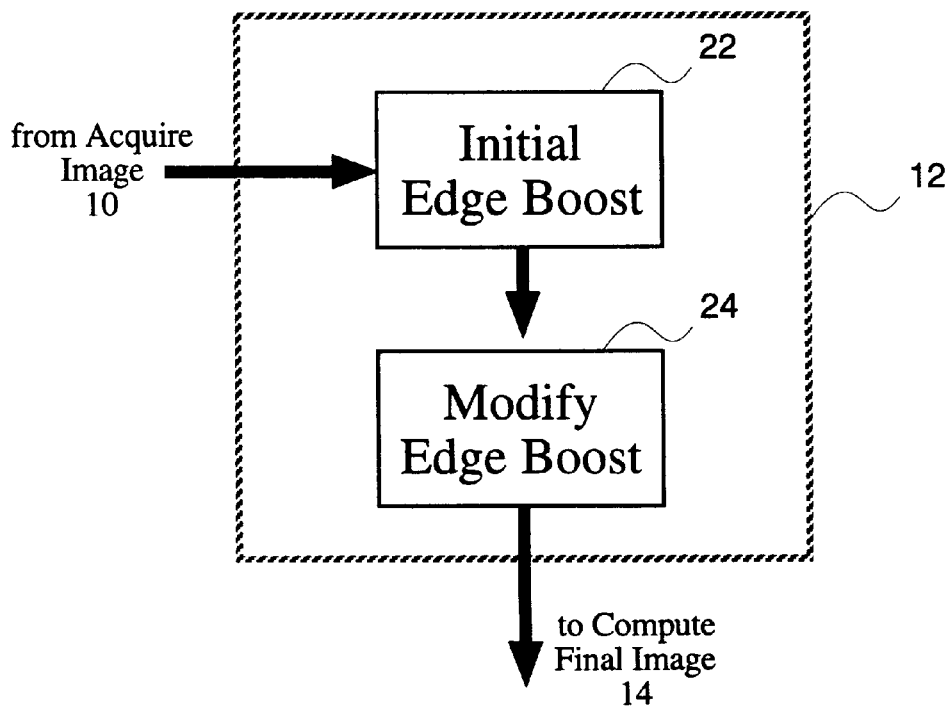
FIG. 5 shows a more detailed block diagram of the compute and edge boost block shown in FIG. 4.

Details of the compute edge boost block 12 are shown in FIG. 5. The initial edge boost block 22 produces an initial edge boost record by conventional means such as by the application of a boost kernel, for example, see FIGS. 2A–2C. The initial edge boost record receives subsequent processing in the modify edge boost block 24. The subsequent processing of the initial edge boost record is the subject of the present invention.

Edge boost records sharpen images by emphasizing edge features, which is accomplished by making the light side of an edge lighter and the dark side of an edge darker. Edge boost records produced by the application of boost kernels, such as the ones shown in FIGS. 2A–2C, add and subtract lightness in equal amounts for a net lightness change of zero in the whole image. This positive and negative balance occurs because the sum of the kernel coefficients is zero. However, the sharpening impact of lightening a light side of an edge is less than the impact of darkening the dark side of an edge.

Figure 6A:
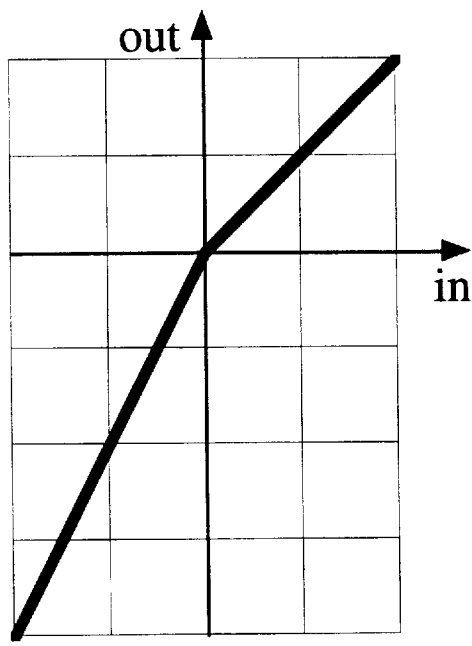
FIG. 6A shows a transfer function with different gains for positive and negative values.
Figure 6B:
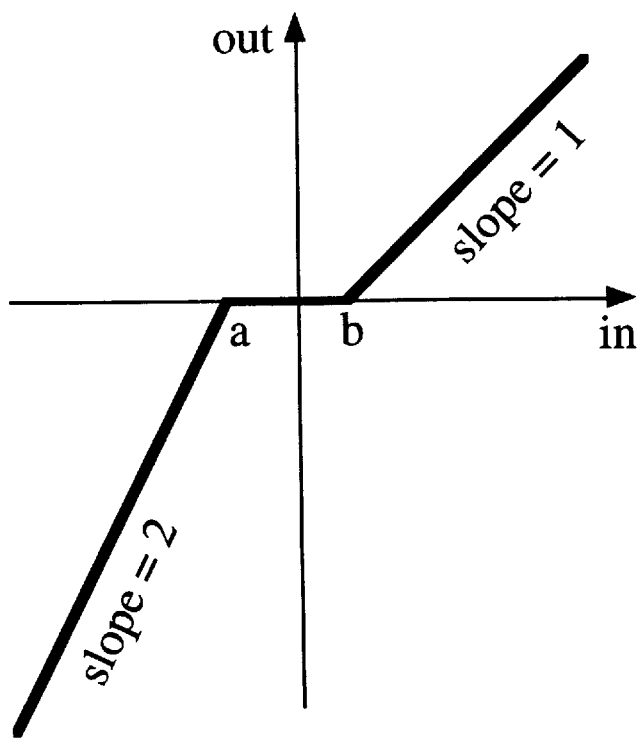
FIG. 6B shows a coring function with different gains for positive and negative values.

The present invention calls for different gains to be applied to positive and negative edge boost values, thus producing an unbalanced or asymmetric edge boost record. An asymmetric edge boost record refers to an edge boost record in which the positive and negative boost values have been amplified unequally. An example of such a transfer function is shown in FIG. 6A. An initial edge boost value is taken as input and a modified edge boost value is obtained as output. As a result, a unit gain is applied to all positive boost values and a gain of two is applied to all negative boost values. The resulting modified edge boost value would then be further modified by applying a conventional coring function such as those shown in FIGS. 3A–3C. An alternative method for accomplishing an asymmetric edge boost record is to modify an initial edge boost value by an asymmetric coring function such as shown in FIG. 6B. In this implementation, the asymmetric gains are incorporated into the coring operation. The coring function in FIG. 6B only shows the function properties near zero. Each of the symmetric coring functions shown in FIGS. 2A–2C has a corresponding asymmetric version.

Figure 1A:
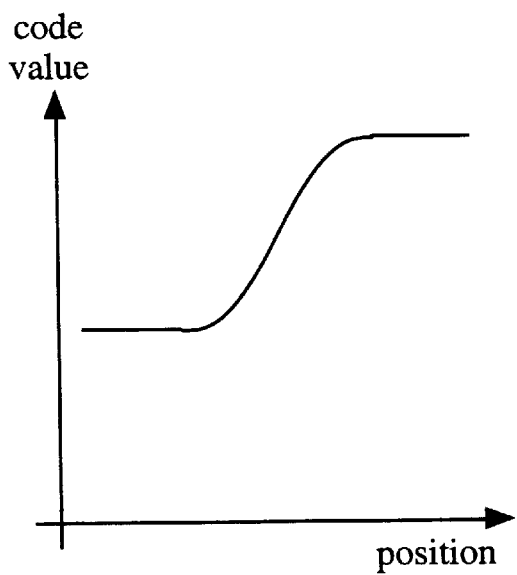
FIG. 1A is a graph of a prior art edge profile of a digital image taken with respect to position vs. code values.
Figure 1B:
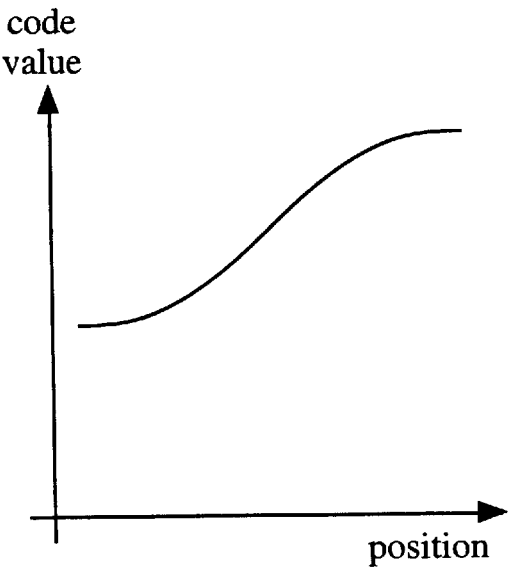
FIG. 1B is the profile of FIG. 1A which has been blurred in the prior process of unsharp masking.
Figure 1C:
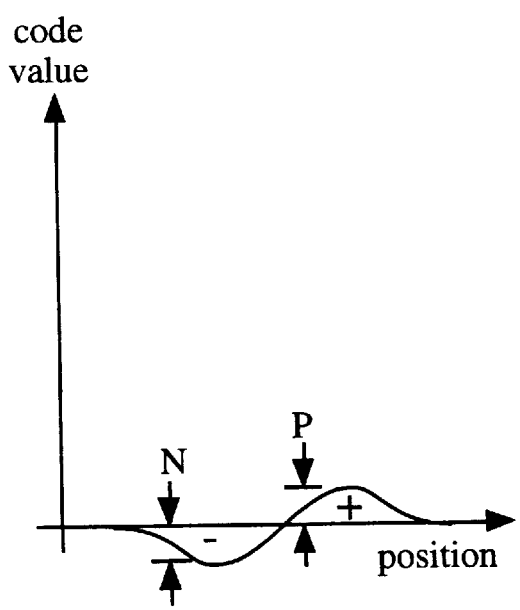
FIG. 1C depicts positive and negative boosts for image sharpening in the prior art.
Figure 1D:
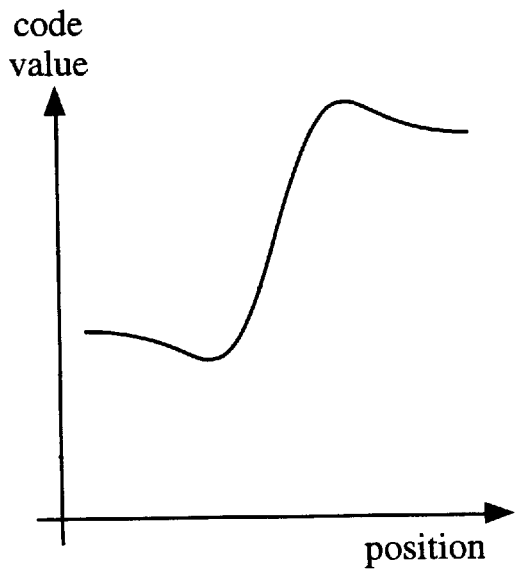
Figure 7A:
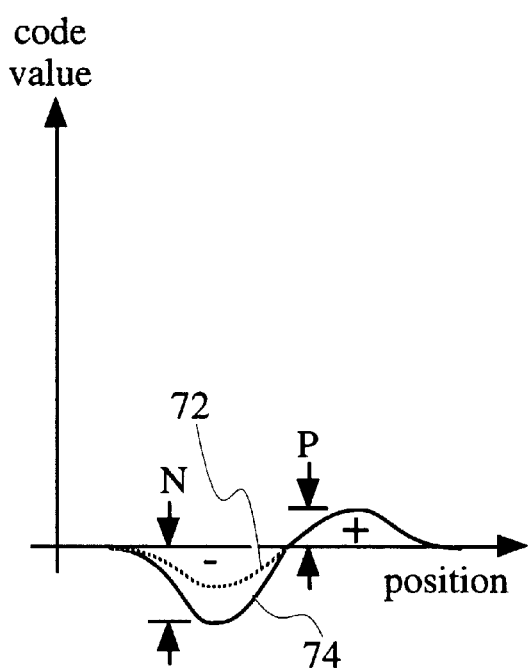
FIG. 7A shows two edge boost curves, one with symmetric gains and one with asymmetric gains for positive and negative values.
Figure 7B:
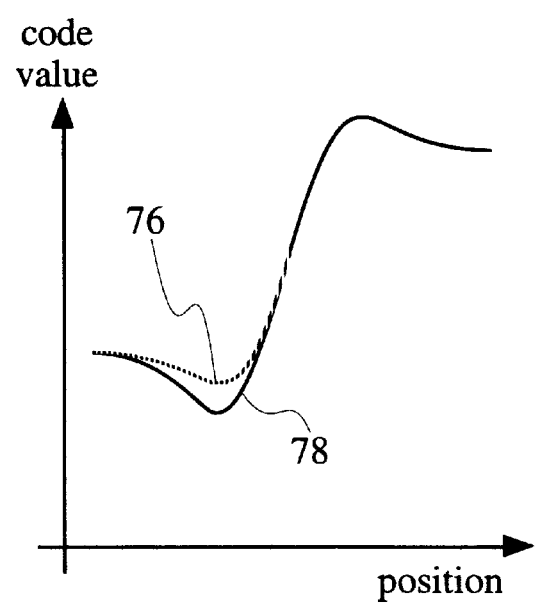
FIG. 7B shows the two boost curves of FIG. 7A applied to the original edge profile of FIG. 1A.

Referring to FIG. 7A, two edge boost curves are shown. The curve 72, taken from FIG. 1C, has symmetric positive and negative boost values of approximately the same size. The curve 74, obtained by applying asymmetric gains to the positive and negative boost values of curve 72, has amplitudes P and N, for positive and negative boost respectively, which are of different sizes. When the modified curve 74 of FIG. 7A is added to the original curve in FIG. 1A, the final curve, shown in FIG. 7B, depicts the profile of the sharpened edge. The sharpened edge profile 76 is taken from FIG. 1D and is obtained from using the initial boost curve 72. The improved sharpened edge profile 78 is obtained from using the modified boost curve 74.

A practical limit to increasing edge sharpening is often the appearance of artifacts such as a light halo around dark features and a dark outline around light features in an image, however, for a symmetric edge boost record the light halo usually becomes objectionable first. By amplifying the negative boost values more than the positive boost values, a greater degree of edge sharpness may be obtained without artifacts. The preferable ratio of negative amplification to positive amplification falls in the range from 1.5 to 2.0.

The computer readable storage medium may comprise, for example; magnetic storage media such as magnetic disc (such as a floppy disc) or magnetic tape; optical storage media such as optical disk, optical tape, or machine readable bar code; solid state electronic storage devices such as random access memory (RAM), or read only memory (ROM); or any other physical device or medium employed to store a computer program.

The invention has been described in detail with particular reference to certain preferred embodiments thereof, but it will be understood that variations and modifications can be effected within the spirit and scope of the invention.

| PARTS LIST | |
|---|---|
| 10 | image block |
| 12 | compute edge boost block |
| 14 | compute final image block |
| 22 | initial edge boost block |
| 24 | modify edge boost block |
| 72 | curve |
| 74 | curve |
| 76 | edge profile |
| 78 | edge profile |

What is claimed is:

1. A method of edge enhancing a digital image having pixels, comprising the steps of:
   a) acquiring a digital image;
   b) computing an edge boost function having positive and negative boost for different portions of the edge of the digital image;
   c) adjusting the edge boost function to produce a modified edge boost function such that the gain of the negative boost is greater than the gain of the positive boost; and
   d) applying the modified edge boost function to the digital image to provide an edge enhanced digital image.

2. The method of claim 1 wherein the adjusting step is provided by an asymmetric coring function.

3. The method of claim 1 wherein the adjusting step includes providing positive and negative gains to the positive and negative portions of the edge boost function to produce an intermediate edge boost function and coring the intermediate edge boost to produce the modified edge boost function.

4. The method of claim 1 wherein the modified edge function has a negative portion gain at least 50% higher than the gain of the positive portion.

5. A computer program product edge enhancing a digital image having pixels, comprising a computer readable storage medium having a computer program stored thereon for performing the steps of:
   a) acquiring a digital image;
   b) computing an edge boost function having positive and negative boost for different portions of the edge of the digital image;
   c) adjusting the edge boost function to produce a modified edge boost function such that the gain of the negative boost is greater than the gain of the positive boost; and
   d) applying the modified edge boost function to the digital image to provide an edge enhanced digital image.

* * * * *